United States Patent [19]

Hayashi et al.

[11] Patent Number: 5,210,730
[45] Date of Patent: May 11, 1993

[54] TRACKING ERROR DETECTING APPARATUS FOR USE IN MULTIBEAM OPTICAL DISK DEVICE

[75] Inventors: Akio Hayashi; Koichi Okabe; Shozo Nakagawa, all of Tokyo, Japan

[73] Assignee: Asaca Corporation, Tokyo, Japan

[21] Appl. No.: 640,353

[22] PCT Filed: May 17, 1990

[86] PCT No.: PCT/JP90/00624
§ 371 Date: Jan. 17, 1991
§ 102(e) Date: Jan. 17, 1991

[87] PCT Pub. No.: WO90/14665
PCT Pub. Date: Nov. 29, 1990

[30] Foreign Application Priority Data

May 18, 1989 [JP] Japan ................................. 1-125504

[51] Int. Cl.$^5$ ............................................. G11B 7/13
[52] U.S. Cl. ............................ 369/44.37; 369/44.23;
369/44.28; 369/44.35; 369/44.41; 369/112
[58] Field of Search .............. 369/44.37, 44.41, 44.42,
369/44.12, 44.28, 44.29, 44.24, 112, 110, 105,
118, 32, 44.23, 44.31, 44.35, 44.27, 44.32

[56] References Cited

U.S. PATENT DOCUMENTS

| | | | |
|---|---|---|---|
| 4,010,317 | 3/1977 | Bouwhuis | 369/118 |
| 4,507,766 | 3/1985 | Saimi et al. | 369/44.24 |
| 4,969,137 | 11/1990 | Sugiyama et al. | 369/112 |
| 5,027,337 | 6/1991 | Takahashi et al. | 369/44.41 |
| 5,081,614 | 1/1992 | Takahashi et al. | 369/112 |

*Primary Examiner*—Aristotelis Psitos
*Assistant Examiner*—Muhammad Edun
*Attorney, Agent, or Firm*—Varndell Legal Group

[57] ABSTRACT

In a multi-beam optical disk device in which a signal is recorded on or reproduced from an optical disk by means of a plurality of light beams, a tracking error detecting apparatus is constructed such that the plurality of light beams projected from an optical head are made incident upon the optical disk and one of these light beams is made incident upon a groove formed in the optical disk and a first tracking error signal is derived from the one light beam reflected by or transmitted through the groove, and all the light beams are made incident upon a groove formed in the optical disk and a second tracking error signal is derived from all the beams reflected by or transmitted through the groove.

4 Claims, 10 Drawing Sheets

TRACKING ERROR DETECTING APPARATUS FOR USE IN MULTIBEAM OPTICAL DISK DEVICE

BACKGROUND OF THE INVENTION

The present invention relates to a tracking error detecting apparatus for use in a multi-beam optical disk device in which signals are recorded or reproduced by using a plurality of beam spots.

In an optical disk device, a record track on an optical disk is traced with the aid of a light beam spot by moving an optical head in a radial direction of the disk while the optical disk is rotated. In order to trace the record track correctly by the light beam, the tracking control and focusing control are effected.

Figure 1A:
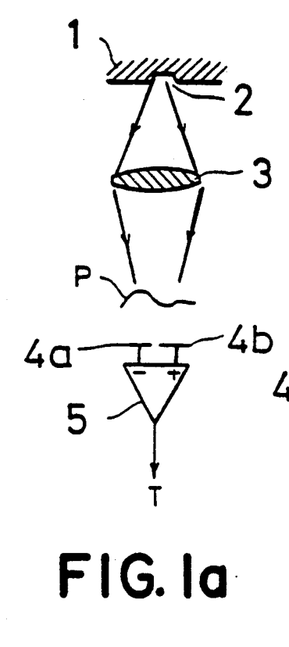
FIGS. 1a, 1b, 1c and FIG. 2 are explanatory views for explaining the tracking control of the push-pull method.
Figure 1B:
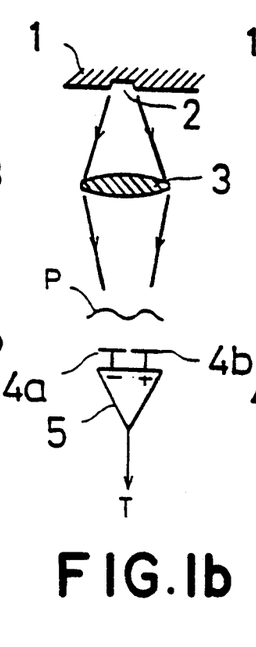
Figure 1C:
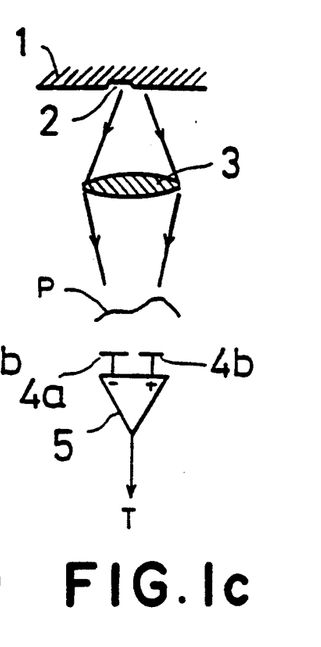
Figure 2:
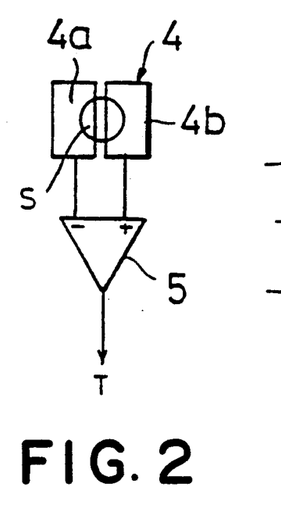

The tracking control has been carried out by various methods, and a typical push-pull method (sometimes called far field method) will be explained. As shown in FIG. 1a, FIG. 1b and FIG. 1c, in a surface of an optical disk 1 there are formed grooves 2, and a light beam spot is projected on the disk surface by means of an objective lens 3. A distribution of the intensity of light reflected by the disk 1 is shown by P. FIG. 2 illustrates the construction of a tracking error detecting circuit in which output signals from two-divided photodiode 4 having two elements 4a and 4b are supplied to a differential amplifier 5 which then produces a tracking error signal T.

Upon the two elements 4a and 4b of the two-divided photodiode 4 is made incident a light spot S of the light beam reflected from the disk. FIG. 1b shows the case in which the tracking is correctly attained, and intensity of light spot S formed on each of the elements 4a and 4b is equal to each other. Therefore, the tracking error signal T generated by the differential amplifier 5 is zero.

FIG. 1a and FIG. 1c depict the cases in which the tracking is not correctly attained, and the center of the light beam spot is deviated from the center of the groove 2. In this case the intensities of the light spot S reflected from the optical disk 1 and impinging upon the elements 4a and 4b are not identical with each other. Therefore, the differential amplifier 5 generates the tracking error signal T having positive or negative polarity and the tracking error signal T thus obtained is used to perform the tracking control.

Figure 3:
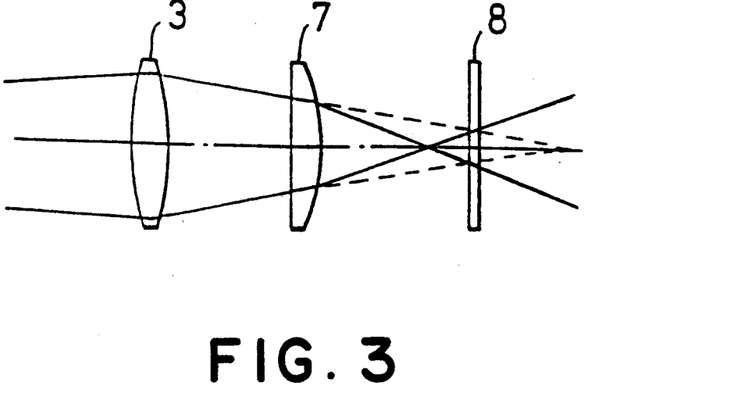
FIGS. 3, 4, 5a, 5b and 5c are explanatory views for explaining the focusing control using a four-divided photodiode.
Figure 4:
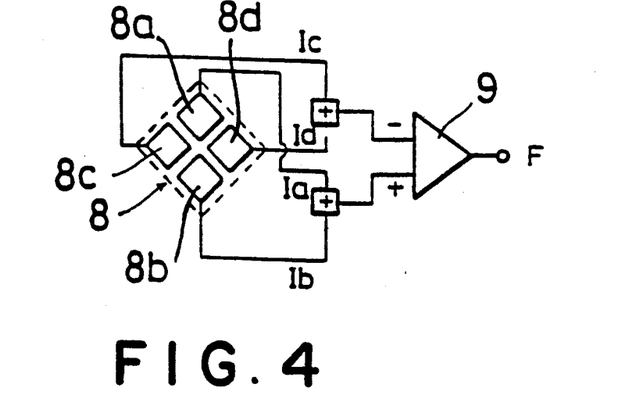

The focusing control has been effected in various methods. In FIG. 3, the light reflected by the optical disk 1 is made incident upon a photo detector 8 by means of the objective lens 3 and cylindrical lens 7. The photo detector 8 is divided into four light receiving elements 8a, 8b, 8c and 8d as illustrated in FIG. 4. Output signals Ia, Ib, Ic and Id generated from the elements 8a, 8b, 8c and 8d, respectively are added by adders and then are supplied to a differential amplifier 9 to derive a focusing error signal $F=(Ia+Ib)-(Ic+Id)$.

Figure 5A:
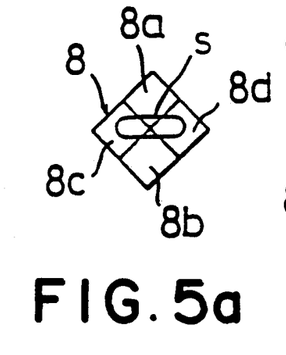
Figure 5B:
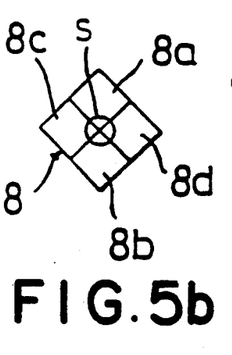
Figure 5C:
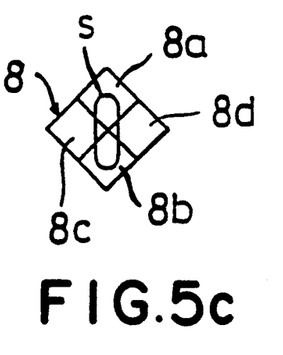

When the optical disk 1 is in the in-focus position, the light beam reflected by the optical disk 1 forms a circular light beam spot S on the light receiving element 8 as shown in FIG. 5b, so that the focusing error signal F becomes zero. However, when the optical disk 1 is in the out-of-focus position, the reflected light beam spot S having a shape shown in FIG. 5a or FIG. 5c is formed on the light receiving element 8, and thus the focusing error signal F having positive or negative polarity is generated. The objective lens 3 is moved by the automatic focusing control mechanism to attain the correct focus condition.

Figure 6:
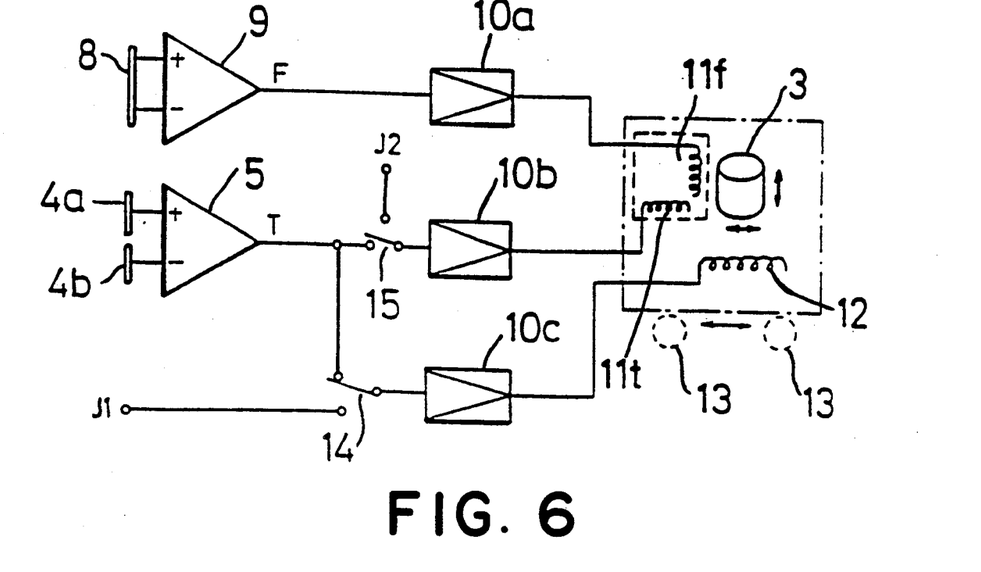
FIG. 6 is a view showing a whole construction of tracking control and focusing control.

FIG. 6 is a view showing a whole construction of the above mentioned tracking control and focusing control. In the focusing control system, the focusing error signal F generated by the differential amplifier 9 is amplified by an amplifier 10a and then is supplied to a lens driving mechanism 11f which moves the objective lens 3. In the tracking control system, the tracking error signal produced by the differential amplifier 5 is supplied via an amplifier 10b to a lens driving mechanism 11t to move the objective lens 3. J1 denotes a slider signal for accessing a desired track, and when the optical head is moved in the radial direction to access a desired track, the slider signal is supplied via a driving amplifier 10c to a slider 12. To this end the optical head is placed on rollers 13. The driving amplifiers 10a and 10b have a frequency range of several tens k Hz to effect the fine tracking control, while the driving amplifier 10c has a frequency range of several k Hz to effect the coarse tracking control. A switch 14 is provided to select either the slider signal for retrieval J1 or the tracking signal T, and a switch 15 is provided for selecting one of the tracking signal T and a track jump signal J2.

In order to access a given track on the optical disk by moving the optical head over a long distance, the switch 14 is connected to J1 side and the tracking control system is disconnected. By means of the slider signal J1, the slider 12 is accelerated into a given direction for a given time period and then is decelerated. Next the switch 15 is switched into the side of the track jump signal J2 and the light spot is jumped over one track by supplying a pulse current. An address signal recorded in a track is checked to derive the number of tracks over which the light spot has to be jumped until a desired track is accessed, and the track jump is repeated by the detected number of times. After the desired track has been accessed, the switches 14 and 15 are driven into the side of the differential amplifier 5, and then the usual tracking control is carried out with the aid of the tracking error signal T.

In a multi-beam optical disk device in which a plurality of light beams are projected from a single optical head and a plurality of tracks are simultaneously recorded or reproduced in order to increase the data transfer rate, it is also possible to derive the focusing error signal F and tracking error signal T by similar methods to those explained above.

Figure 7A:
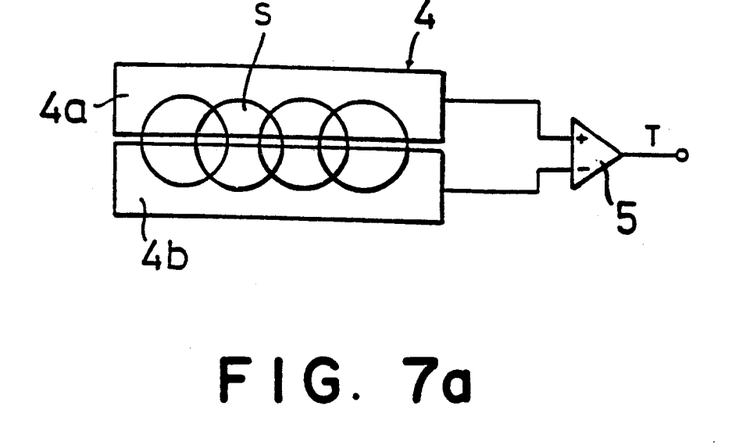
FIG. 7a and FIG. 7b show the electrical construction of a tracking error detecting circuit of multi-beam push-pull method.
Figure 7B:
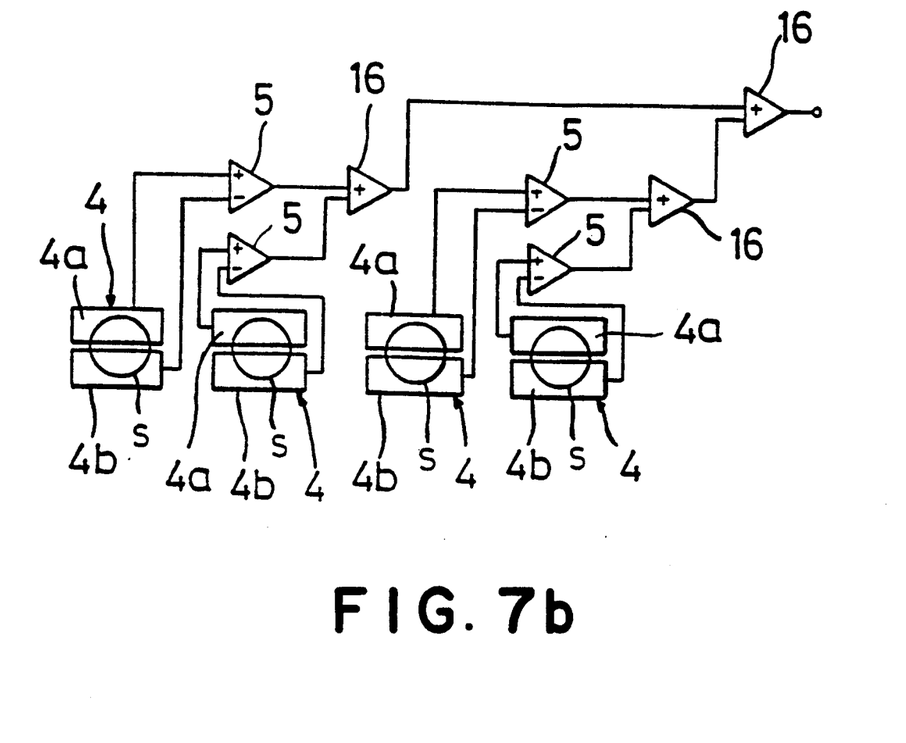

In order to effect the track jump accurately each time the track access is to be performed in the multi-beam optical disk device, it is necessary to derive tracking error signals for respective light beam spots. For instance, a tracking error detecting circuit of the push-pull method shown in FIG. 7a and FIG. 7b may be used. In FIG. 7a, the two-divided photodiode 4 illustrated in FIG. 2 is used for the four light beams, and in FIG. 7b, a plurality of two-divided photodiodes 4 are used. The function of the device shown in FIG. 7b is substantially same as that of the device depicted in FIG. 7a. A reference numeral 16 denotes an adder.

In the push-pull method, a difference in intensity of first order interference light in the perpendicular direction to the track direction due to the groove 2 of the optical disk 1 is detected, so that a signal similar to the tracking error signal is derived even when the objective lens 3 is shifted in the tracking direction with respect to the optical axis and when the optical disk is inclined. Therefore, the zero point of the tracking error signal is shifted to produce the tracking off-set. That is a fault of the push-pull method. Although the tracking error signal is obtained from a predetermined single light beam, the tracking off-set signal is increased by n times as compared with the tracking off-set which is obtained by a signal light beam, wherein n is the number of light beams which are used simultaneously. In practice, there is obtained a signal which is a mixture of the tracking error signal and the tracking off-set signal and it is difficult to extract only the tracking error signal.

SUMMARY OF THE INVENTION

An object of the present invention is to provide a tracking error detecting apparatus for use in the multi-beam optical disk device in which the recording or reproducing is carried out for a plurality of record tracks with the aid of a plurality of light beams projected by an optical head.

According to the invention a predetermined light beam among a plurality of light beams is selectively made incident upon a groove and the tracking error signal is derived by processing said predetermined light beam reflected by or transmitted through the optical disk while the generation of the tracking off-set can be avoided.

BRIEF DESCRIPTION OF THE DRAWINGS

FIGS. 8 to 13b are views for explaining embodiments of the tracking error detecting apparatus for using the multi-beam optical disk device according to the invention, in which:

DESCRIPTION OF THE PREFERRED EMBODIMENTS

The present invention will be explained in detail with reference to embodiments illustrated in figures succeeding FIG. 8.

Figure 8:
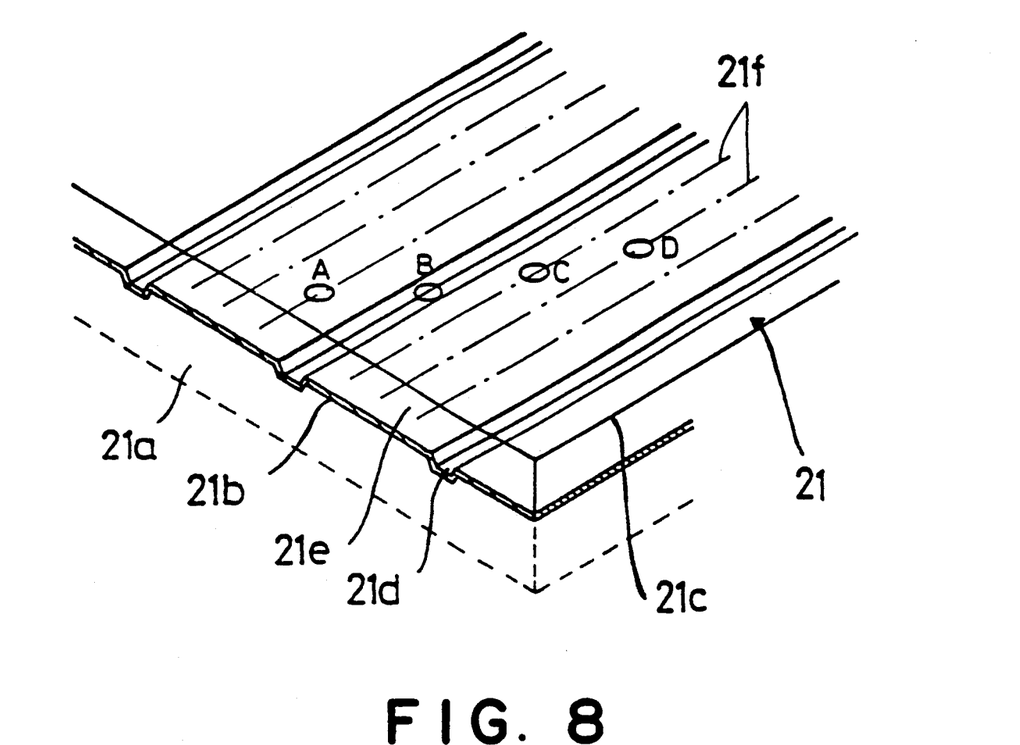
FIG. 8 is a perspective cross sectional view showing the optical disk.

FIG. 8 is an explanatory figure for explaining the embodiments commonly. An optical disk 21 comprises transparent substrate 21a, record medium 21b and protection layer 21c. In the transparent substrate 21a there are formed grooves 21d, and on the substrate are applied the record medium 21b and protection layer 21c. A portion of the record medium except for the grooves 21d is called the land 21e, and a reference numeral 21f denotes center lines of record tracks. Further reference characters A, B, C and D represent light beam spots which are projected from the lower surface of the optical disk 21. One light beam spot B selected among the four light beam spots A to D is made incident upon the groove 21d. That is to say, among the four light beam spots A to D the light beam spot B which is closest to the optical axis of the optical system is made incident upon the groove 21d. Since the focusing error detection is liable to be affected by the distortion of the optical system, the light beam spot B closest tot he optical axis is used for the deviation, said light beam spot B being affected by the distortion to the least extent.

Figure 9A:
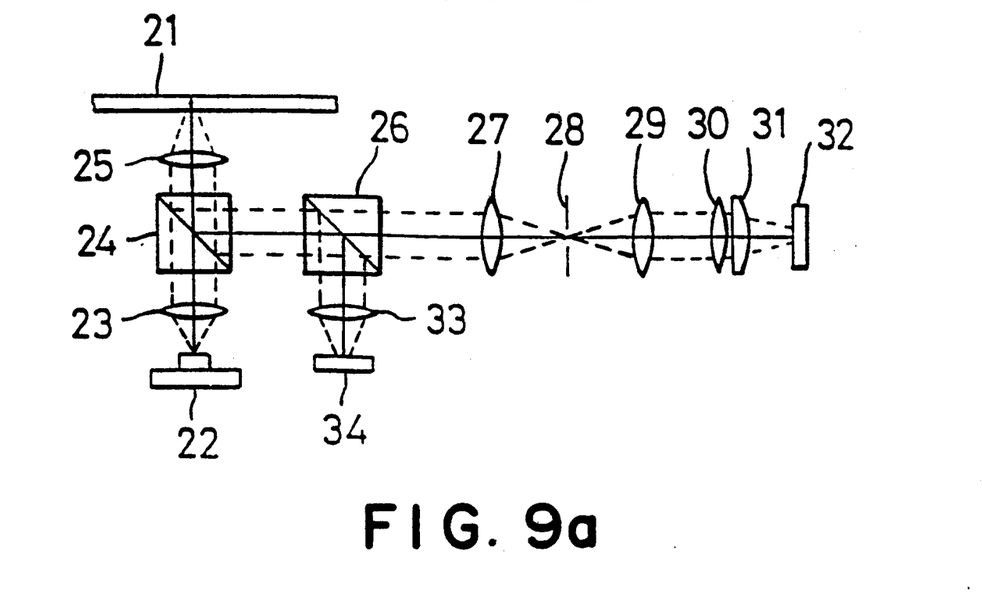
FIG. 9a shows the construction of the optical system of a first embodiment.

FIG. 9a shows a first embodiment in which the light beam B for detecting the focusing and tracking errors is separated from the remaining light beam spots A, C and D with the aid of a pin hole. FIG. 9a shows the optical system in which between the optical disk 21 and a laser array 22 for producing four light beams are arranged collimator lens 23, half mirror 24 and objective lens 25 in this order. In an optical path of a light beam reflected by the half mirror 24 are arranged half mirror 26, condenser lens 27, pin hole plate 28 condenser lenses 29, 30 cylindrical lens 31 and four-divided photodiode 32. In an optical path of a light beam reflected by the half mirror 26 are arranged condenser lens 33 and two-divided photodiode 34.

Figure 9B:
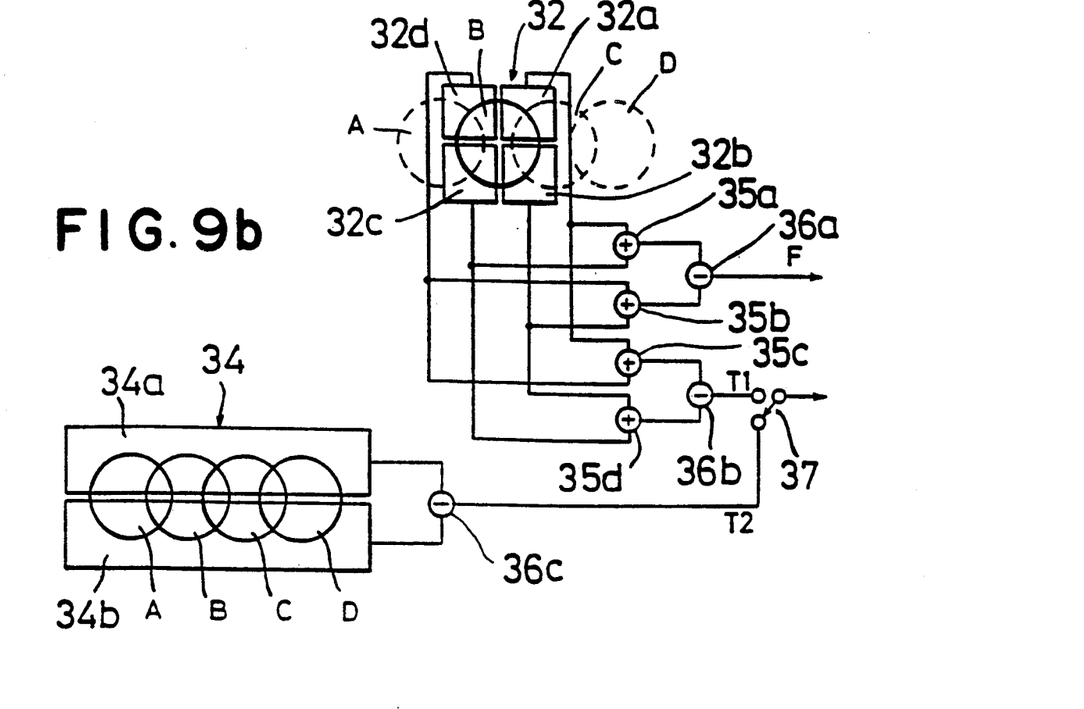
FIG. 9b is a circuit diagram of the first embodiment.

FIG. 9b depicts the electrical construction, and the four-divided photodiode 32 is divided into four elements 32a, 32b, 32c and 32d. Output of these elements are connected to adders 35a, 35b, 35c and 35d, and outputs of these adders are connected to differential amplifiers 36a and 36b. The differential amplifier 36a produces the focusing error signal F and the differential amplifier 36b produces the tracking error signal T1 which is supplied to a switch 37. The two-divided photodiode 34 is divided into two elements 34a and 34b whose outputs are connected to a differential amplifier 36c and an output of this differential amplifier is connected to the switch 37. Then the switch 37 serves to select one of the output signals of the differential amplifiers 36b and 36c.

Figure 9C:
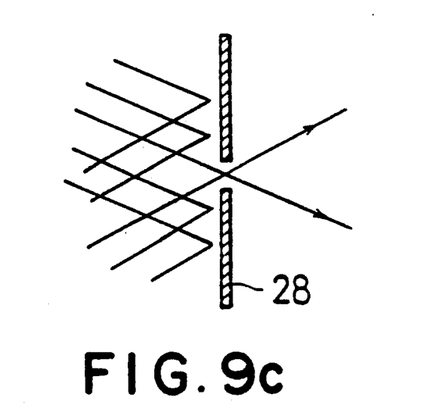
FIG. 9c is an explanatory view representing the function of the pin hole.

The four light beam spots A, B, C and D reflected by the optical disk 21 are reflected by the half mirror 24, transmitted through the half mirror 26 and then are converged by the condenser lens 27. Since there is provided the pin hole plate 28, the beam spots A, C and D are shielded thereby, and only the beam spot B is transmitted through the pin hole plate 28 as shown in FIG. 9c. The beam spot B is then made incident upon the four-divided photodiode 32 by means of the condenser lenses 29, 30 and cylindrical lens 31. The four-divided photodiode 32 has the similar function to that explained with reference to FIG. 3 to FIG. 5, and the focusing error signal F can be obtained by deriving a difference between the output signals of the adders 35a and 35b by the differential amplifier 36a. Further the tracking error signal T1 similar to that explained above with reference to FIG. 1 and FIG. 8 can be obtained by deriving a difference by the differential amplifier 36b between the output signals of the adders 35c and 35d.

A part of the light reflected by the optical disk 21 is reflected by the half mirrors 24, 26 and is made incident upon the two-divided photodiode 34 by means of the condenser lens 33. As shown in FIG. 7a, the two-divided photodiode 34 operates as the tracking error detector of the push-pull method for the multi-beam optical disk device. As explained above with reference to FIG. 7, the zero point of the tracking error signal T2 produced by the differential amplifier 36c is shifted due to the inclination of the optical disk 21, so that it does not represent the true tracking error. In order to effect the track jump and track access precisely, it is necessary to obtain the tracking error signal accurately for respective tracks, because it is practically difficult to effect the track jump for a set of four tracks. To this end the beam spots A, B, C and D are projected by turns on the groove 21d to derive the tracking error signal by the two-divided photodiode 34. At first, the switch 37 is connected to the side of the differential amplifier 36c so that the beam spot B can trace a given track. Then the switch 37 is changed into the side of the differential amplifier 36b and the recording, reproducing or erasing operation is carried out.

Figure 9D:
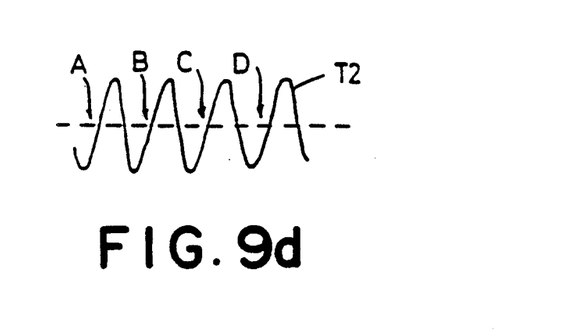
FIG. 9d and FIG. 9e are waveforms of the tracking error signal.

FIG. 9d depicts the tracking error signal T2 which is obtained when the switch 37 is connected to the side of the differential amplifier 36c to effect the track jump or track access. Since the beam spots A, B, C and D are obtained by the light beams which are projected on the groove 21d successively, there are produced the tracking error signals for respective beam spots A to D.

Figure 9E:
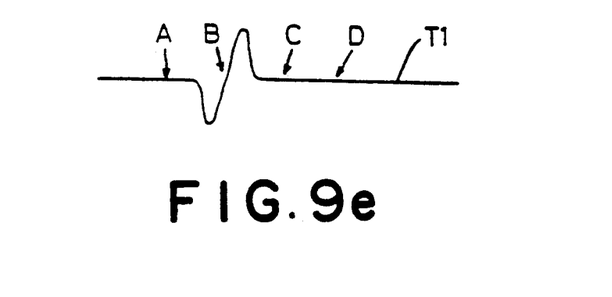

FIG. 9e represents the tracking error signal T1 which is produced when the switch 37 is connected to the side of the differential amplifier 36b to effect the recording, reproducing or erasing. The tracking error signal is obtained only by the beam spot B of the light beam which is projected on the groove 21d.

Figure 10A:
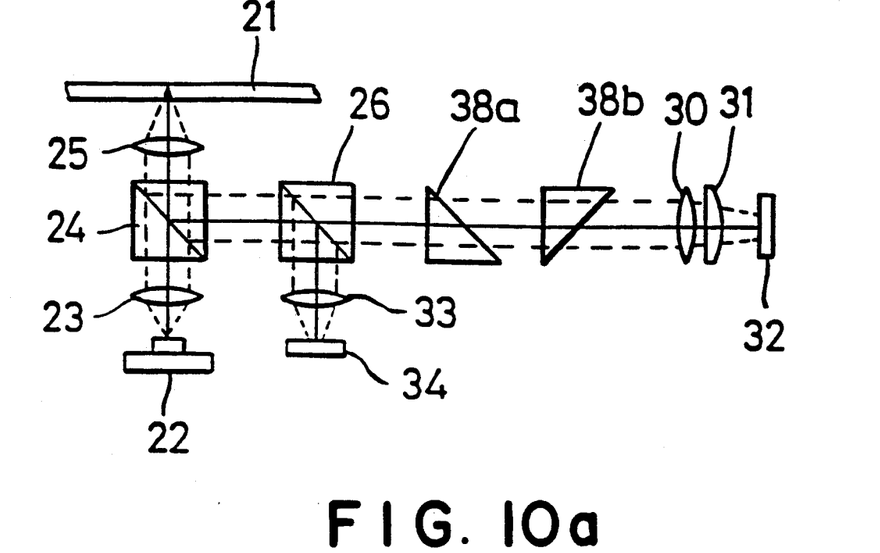
FIG. 10a is an explanatory view for explaining the function of the critical angle prism.
Figure 10B:
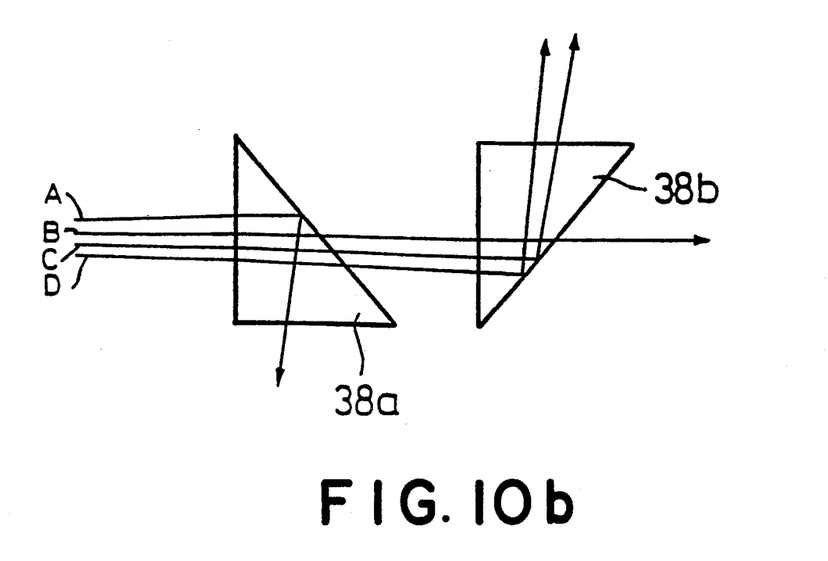
FIG. 10b depicts the construction of the optical system of a second embodiment.

FIGS. 10a and 10b illustrate a second embodiment in which only the beam spot B is used for detecting the focusing error and tracking error, and the remaining beam spots A, C and D are removed by means of a critical angle prism 38. FIG. 10a shows the optical construction using two critical angle prisms 38a and 38b instead of the condenser lens 27, pin hole plate 28 and condenser lens 29 shown in FIG. 9a. FIG. 10b is an explanatory view for explaining the function of the critical angle prism 38. It should be noted that the electrical construction of the second embodiment is the same as the first embodiment shown in FIG. 9b. Due to the function of the critical angle prisms, the critical angle prisms 38a and 39b extract only the light beam spot B among the light beam spots A to D and the extracted beam spot B is made incident upon the four-divided photodiode 32 by means of the condenser lens 30 and cylindrical lens 31. Then there are obtained the focusing error signal F and two tracking error signals T1 and T2 in the similar manner to that of the embodiment shown in FIG. 9b.

In the second embodiment, the tracking error detecting beam spot and the focusing error detecting beam spot are commonly formed by the same beam spot, and the photodiode for detecting the tracking error signal and the photodiode for detecting the focusing error signal are also commonly formed by the same photodiode.

Figure 11A:
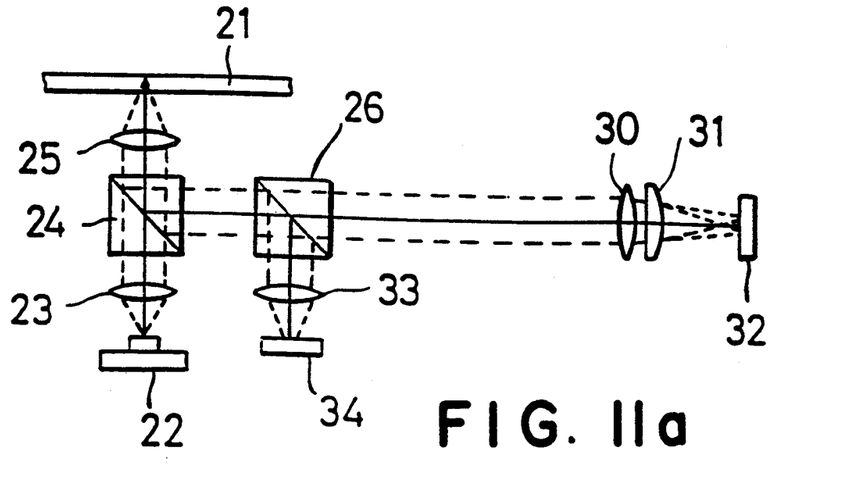
FIGS. 11a and FIG. 11c show the construction of the optical system of a third embodiment.
Figure 11B:
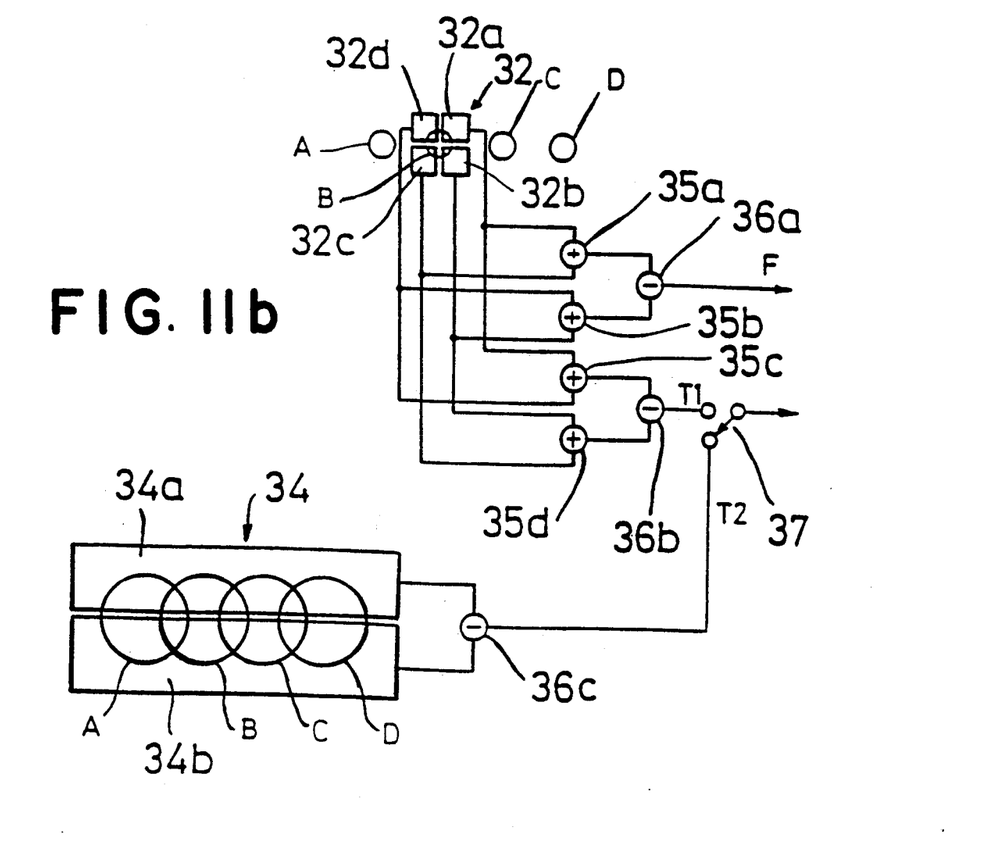
FIG. 11b is a circuit diagram of the third embodiment.
Figure 11C:
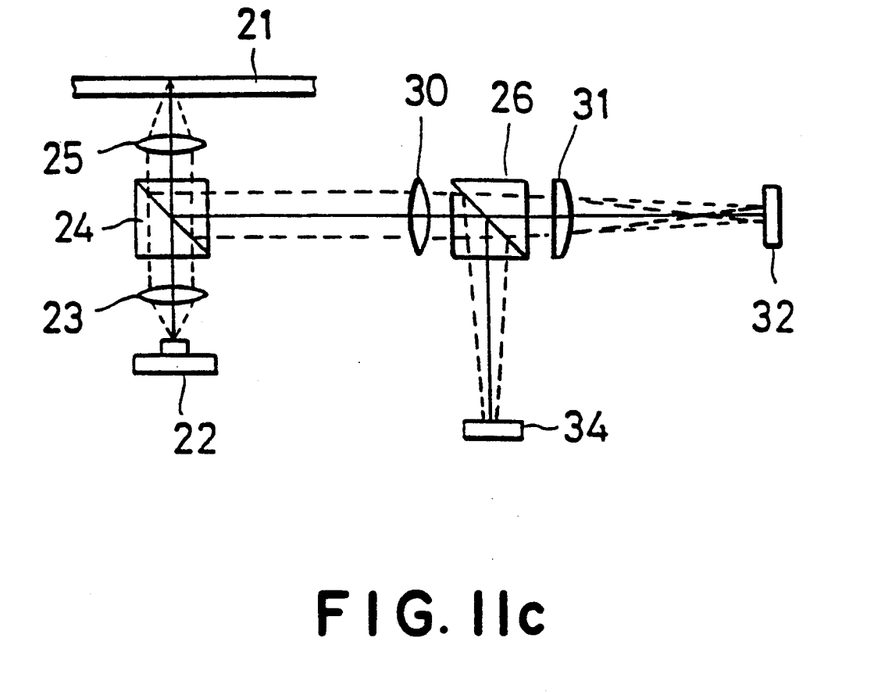

FIGS. 11a, 11b and 11c show a third embodiment in which only the beam spot B among the four beam spots A to D is used to detect the focusing error and tracking error and the four-divided photodiode 32 is formed to be sufficiently small for being illuminated only by the beam spot B. As illustrated in FIG. 11a the condenser lens 27, pin hole plate 28 and condenser lens 29 shown in FIG. 9a are all removed, and the size of the elements 32a to 32d of the four-divided photodiode 32 is small with respect to the beam spots A to D as depicted in FIG. 11b. It should be noted that the construction shown in FIG. 11a may be altered in a manner illustrated in FIG. 11c.

In the third embodiment explained above, the same beam spot B is used as both the tracking error detecting beam spot and focusing error detecting beam spot, and the tracking error detecting photodiode and focusing error detecting photodiode are commonly formed by the same photodiode.

Figure 12A:
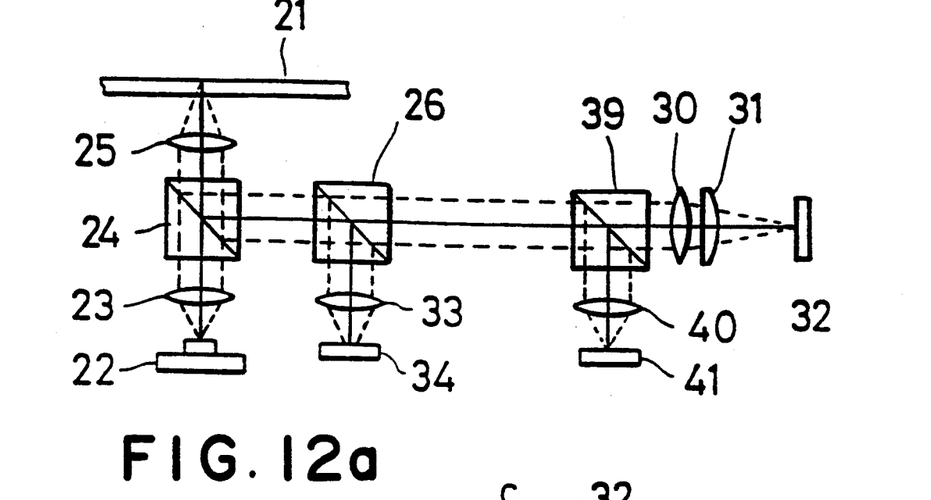
FIG. 12a shows the optical system of a fourth embodiment.
Figure 12B:
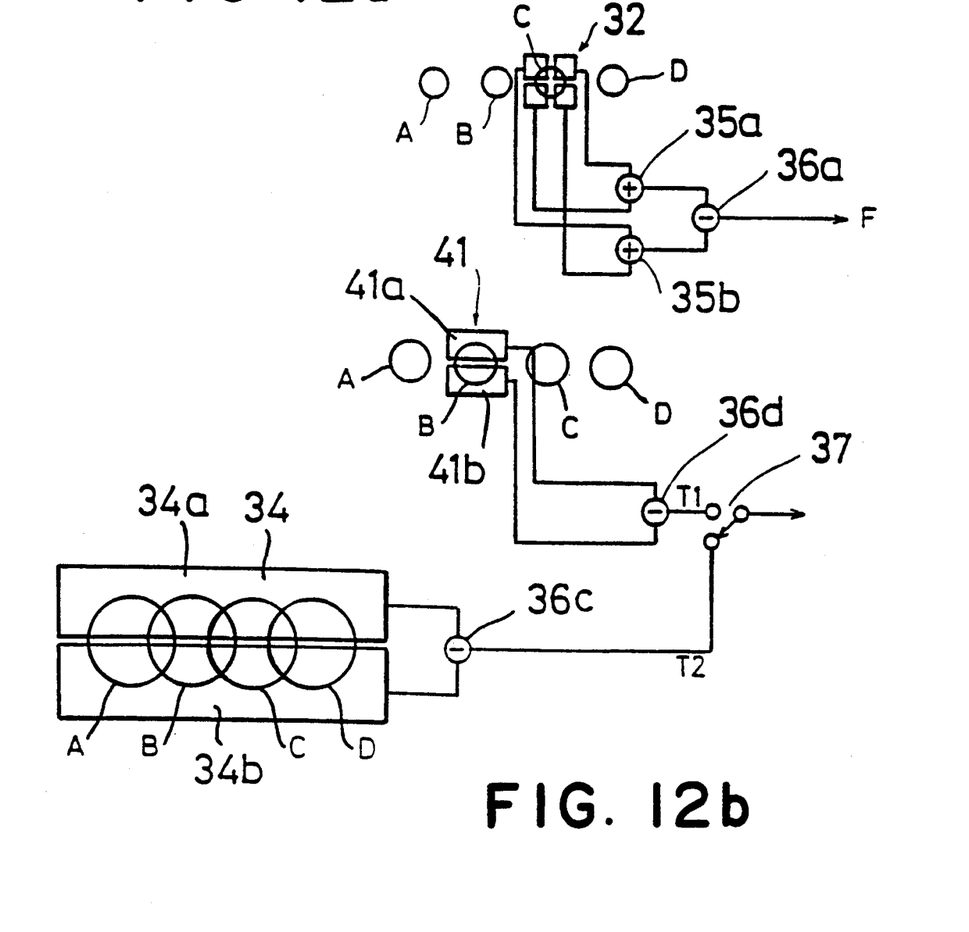
FIG. 12b is a circuit diagram of a fourth embodiment.

FIGS. 12a and 12b show a fourth embodiment in which only the beam spot C among the four beam spots A to D is used as the focusing error detection and the beam spot C is divided into two beam spots at a point before the four-divided photodiode 32, and one of which is made incident upon a first two-divided photodiode 34 and the other of which is made incident upon a second two-divided photodiode 41. As illustrated in FIG. 12a, between the half mirror 26 and the condenser lens 30 is arranged a half mirror 39 and in an optical path of a light beam reflected by the half mirror 39 are arranged condenser lens 40 and two-divided photodiode 41.

FIG. 12b depicts the electrical construction in which output signals from the four-divided photodiode 32 are processed by the adders 35a, 35b and differential amplifier 36a to derive the focusing error signal F similar to that shown in FIG. 4. Output signals from elements 41a and 41b of the two-divided photodiode are supplied to a differential amplifier 36d which produces the tracking error signal T1 similar to that explained in connection with FIG. 8. One of the tracking error signal T1 and tracking error signal T2 produced by the differential amplifier 36c is selected by the switch 37.

In the first, second and third embodiments shown in FIGS. 9, 10 and 11, respectively, both the tracking error and focusing error are detected by commonly using the same beam spot and the same photodiode, so that the precision of the error detection is somewhat decreased due to the mutual interference. However, in the fourth embodiment illustrated in FIG. 12 the tracking error is detected by using the beam spot B and two-divided photodiode 41 and the focusing error is detected by using the beam spot C and four-divided photodiode 32, so that the tracking control and focusing control can be performed accurately without being affected by the mutual interference.

Similar to the first embodiment, upon effecting the track jump or track access, the switch 37 is first connected to the side of the differential amplifier 36c and after a given track has been accessed the switch 37 is changed into the side of the differential amplifier 36d to effect the recording, reproducing or erasing.

Figure 13A:
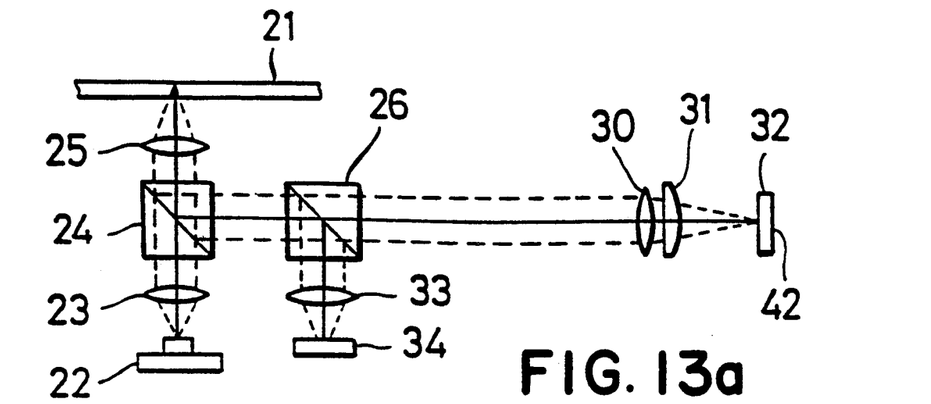
FIG. 13a is a schematic view showing the optical construction of a fifth embodiment.
Figure 13B:
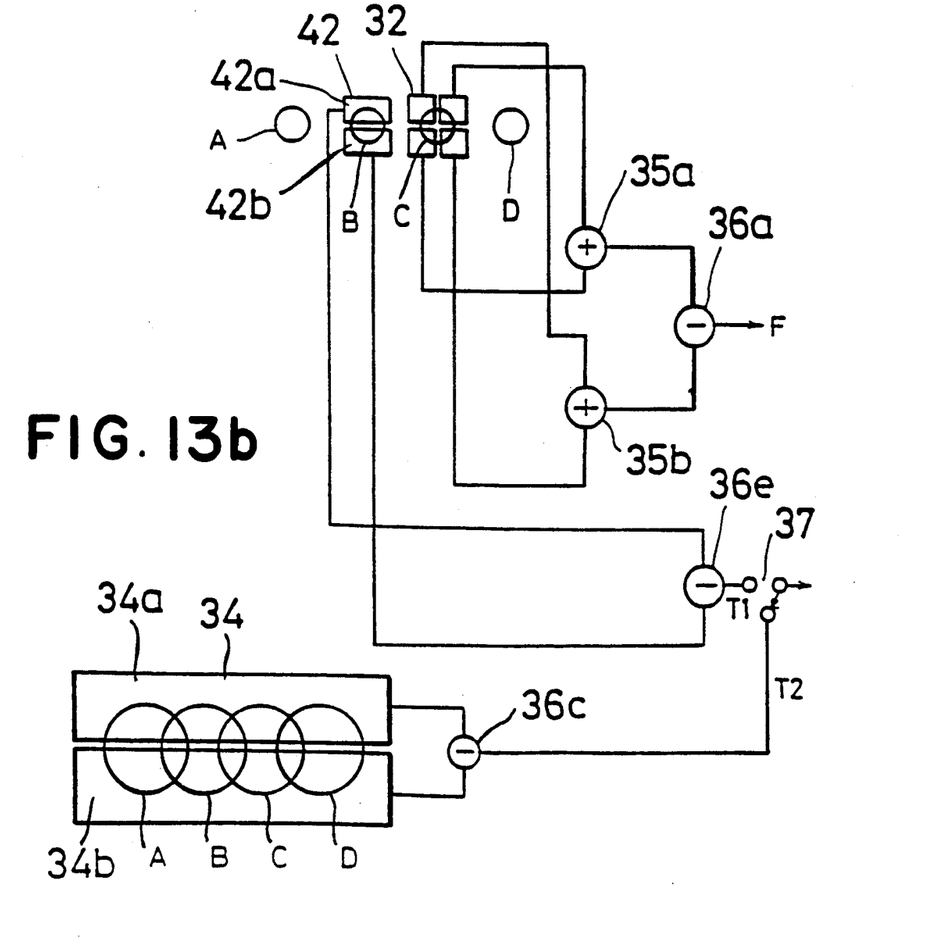
FIG. 13b is a circuit diagram illustrating the electrical construction of the fifth embodiment.

FIGS. 13a and 13b depict a fifth embodiment in which among the four beam spots A to D the beam spot B is selectively used for detecting the tracking error and the beam spot C is used to detect the focusing error, and the beam spot B is projected on the groove in the optical disk 21. The optical construction shown in FIG. 13a is substantially same as that illustrated in FIG. 11a, but the light flux transmitted through the half mirror 26, condenser lens 30 and cylindrical lens 31 is made incident upon the four-divided photodiode 32 and two-divided photodiode 42. It should be noted that these photodiodes 32 and 42 are integrally formed with each other and are arranged in the direction of the array of the four beam spots A to D as shown in FIG. 13b. The four-divided photodiode 32 and two-divided photodiode 42 are formed by relatively small photodiodes so that only the light beam spots B and C are made incident upon these photodiodes 32 and 42, respectively.

As explained with reference to the previous embodiments, output signals of the four-divided photodiode 32 are processed by the adders 35a, 35b and differential amplifier 36a to derive the focusing error signal F. Output signals from the elements 42a and 42b of the two-divided photodiode 42 are supplied to the differential amplifier 36e to produce the tracking error signal T1, and output signals from the two-divided photodiode 34 are supplied to the differential amplifier 36c to derive the tracking error signal T2 similar to that explained above in connection with FIG. 9. One of these tracking error signals T1 and T2 is selected by the switch 37.

In the fifth embodiment illustrated in FIG. 13, the four-divided photodiode 32 for detecting the focusing error and the two-divided photodiode 42 for detecting the tracking error are integrally formed, but they are electrically separated from each other, so that the mutual interference can be removed. Therefore, the tracking control and focusing control can be performed precisely.

Similar to the first embodiment shown in FIG. 9, when the track jump or track access is to be effected, the switch 37 is first connected to the side of the differential amplifier 36c and after a given track has been accessed, the switch 37 is changed into the side of the differential amplifier 36e to perform the recording, reproducing or erasing.

As explained above in the first to third embodiments the single beam spot is extracted from a plurality of beam spots by means of the pin hole plate and crystal angle prisms or by using the four-divided photodiode having a small area and the tracking error and focusing error can be detected without being affected by the remaining beam spots.

In the first to third embodiments, among a plurality of beams the single beam situated on the optical axis or nearest to the optical axis of the optical system is projected upon the groove in the optical disk 21, and the light beam transmitted through or reflected by the groove is processed to derive the focusing error signal F and tracking error signal T. Then the tracking off-set can be reduced by n times and the accurate tracking control can be performed. Further the focusing error detecting photodiode and tracking error detecting photodiode are commonly formed by the same photodiode, so that the number of parts can be decreased and the cost can be reduced.

When the focusing error detecting photodiode and tracking error detecting photodiode are commonly formed by the same photodiode, the focusing error detection and tracking error detection are mutually influenced and the precision of the error detection might be decreased to a small extent. In the fourth embodiment these photodiodes are formed by separate photodiodes, so that both the tracking control and focusing control can be performed accurately.

In the fifth embodiment, two beams nearest to the optical axis of the optical system are selected, and one of these beams is used to detect the tracking error and the other beam spot is used to detect the focusing error. The beam spot for detecting the tracking error is made incident upon the groove formed in the optical disk. The focusing error detecting photodiode and tracking error detecting photodiode are formed by separate photodiodes arranged integrally with each other, so that the mutual influence can be avoided and the tracking control and focusing control can be performed accurately.

Further when the tracking error detection signal according to the invention and the tracking error detection signal obtained by the known push-pull method in which n light beams are made incident upon the two-divided photodiode are selectively used, tracking error upon the track jump and track access can be reduced.

As explained above, the tracking error detecting apparatus for use in multi-beam optical disk device according to the invention can remove the drawbacks of the conventional apparatus in which all of n light beams reflected by the optical disk are used to detect the tracking error, so that the tracking error detection is largely affected by the shift of the objective lens in the tracking direction with respect to the optical axis and the tracking off-set is increased by n times due to the inclination of the surface of the optical disk.

We claim:

1. A tracking error detecting apparatus for use in a multi-beam optical beam device comprising:
   an optical means for deriving a plurality of light beams emanating from an optical disk having grooves;
   a first tracking error detecting means including a first photoelectric converting element having at least two light receiving regions for receiving a single light beam incident thereto selected from said plurality of light beams derived from said optical means and a first circuit means for processing output signals from said first photoelectric converting element to produce a first tracking error signal;
   a second tracking error detecting means including a second photoelectric converting element having two light receiving regions for receiving all of said plurality of light beams derived by said optical means arranged incident thereto and a second circuit means for processing output signals from said second photoelectric converting element to produce a second tracking error signal; and
   a switching means for receiving said first and second tracking error signals and selectively supplying said first tracking error signal during recording and reproducing and said second tracking error signal during a track jump.

2. An apparatus according to claim 1, wherein said first tracking error detecting means further comprising a light beam selecting optical element for selecting, among said plurality of light beams derived from said optical beams, a light beam which is nearest to an optical axis of said optical means as said signal light beam.

3. An apparatus according to claim 2, wherein said light beam selecting optical element is a pin hole.

4. An apparatus according to claim 2, wherein said light beam selecting optical element by a critical angle prism.

* * * * *